United States Patent [19]

Deland

[11] 4,132,010
[45] Jan. 2, 1979

[54] MOBILE SAND DE-OILING APPARATUS
[75] Inventor: Robert E. Deland, Taunton, Mass.
[73] Assignee: Costal Services, Inc., Braintree, Mass.
[21] Appl. No.: 818,877
[22] Filed: Jul. 25, 1977
[51] Int. Cl.² ............................. B08B 3/00; B08B 3/10
[52] U.S. Cl. .......................................... 34/60; 34/12;
    34/168; 134/37; 134/123; 210/274
[58] Field of Search ............... 34/12, 60; 134/37, 123;
    210/274

[56] References Cited
U.S. PATENT DOCUMENTS

| | | | |
|---|---|---|---|
| 1,069,737 | 8/1913 | Stevenson | 210/274 X |
| 3,197,415 | 7/1965 | Hendrix | 210/274 X |
| 8,977,745 | 9/1908 | Jäder | 210/274 |

*Primary Examiner*—Leland A. Sebastian
*Attorney, Agent, or Firm*—Robert A. Cesari; John F. McKenna; Andrew F. Kehoe

[57] ABSTRACT

Mobile sand de-oiling apparatus can be transported along beaches to cleanse sand contaminated by oil and other liquid petroleum products washed onto the beach. The contaminated sand is conveyed into one end of the apparatus and deposited as a layer onto a specially constructed inclined laminated perforate tray. The tray osculates vigorously so that the sand is not only conveyed along the tray where it is exposed to a multiplicity of overhead steam jets, but also clumps of sand are bounced up and down with the result that the individual sand particles separate from one another and turn and spin so that their entire surfaces are exposed to the hot steam. The steam thins the oil which is driven from the sand particles by the steam jets through the tray into a sump. The clean sand is discharged from the opposite end of the tray onto a conveyor which transports it to a storage site.

8 Claims, 3 Drawing Figures

MOBILE SAND DE-OILING APPARATUS

BACKGROUND OF THE INVENTION

This invention relates to apparatus for decontaminating sand. It relates more particularly to a mobile machine for cleansing oil from beach sand.

As a result of the installation of off-shore oil rigs and the incidence of collisions between, and leaks in, oil-laden ships at sea, the pollution of beaches by oil spillage carried up on the beach by wind and waves has become a real problem. Liquid petroleum products adhere to the sand particles and cause the particles to agglomerate into sticky, oily clumps and globs which are a nuisance to bathers and a health hazard to bird and marine life.

The characteristics of the oil-laden sand depend not only upon the amount of the spillage involved, but also the type of spillage. Sand particles contaminated by very heavy oil such as Bunker C are joined together as relatively dense, hard slabs or clumps while sand exposed to gasoline or light machine oil may be less agglomerated but more slippery or oily to the touch.

Heretofore the only effective and relatively economical way to alleviate the problem of such beach contamination is the physical removal of the contaminated sand. While this solution is satisfactory in situations where spillage is slight and the sand plentiful, it is not practical in cases of massive spillage or where sand is less plentiful because of wind and water errosion and other geographical considerations.

SUMMARY OF THE INVENTION

Accordingly the present invention aims to provide apparatus for cleansing sand of a wide variety of oils and other liquid petroleum products.

A further object of the invention is to provide apparatus of this type which removes oil from the sand particles efficiently and relatively economically.

Still another object of the invention is to provide sand de-oiling apparatus which is quite compact and mobile so that it can cleanse the sand right at the contaminated beach site.

Yet another object is to provide such apparatus which is relatively unaffected by shells, rocks and other solid objects present in the contaminated sand.

Another object of the invention is to provide mobile sand de-oiling apparatus which is relatively easy to operate and maintain.

Other objects will, in part, be obvious and will, in part, appear hereinafter.

The invention accordingly comprises the features of construction, combination of elements and arrangement of parts as will be exemplified in the following detailed description, and the scope of the invention will be indicated in the claims.

In general, the present apparatus comprises a wheeled chassis which can be towed to the contaminated beach site or which travels there under its own power. Mounted at one end of the chassis is a large loading hopper. The contaminated sand is transported to the hopper by means of a conveyor mounted on the chassis or by off-road vehicles such as a front end loader.

A bucket elevator mounted on the chassis transports the contaminated sand from the hopper at a controlled rate to the elevated entrance of a cleansing chamber mounted on the chassis. The cleansing chamber removes the oil from the sand particles and after sufficient dwell time in the chamber, the clean sand particles are discharged from the chamber onto a discharge conveyor which transports the sand back to the original site or to an appropriate ground storage location. The oil removed from the sand is, in turn, collected in a large sump supported at the underside of the chassis.

The cleansing chamber comprises an enclosure in which a specially designed perforate tray is caused to osculate in a vertical plane directly below a rectangular array of nozzles which ar supplied with high temperature, high pressure steam from a boiler mounted on the chassis so they produce a multiplicity of high velocity steam jets. The contaminated sand transported to the cleansing chamber is deposited as a relatively thick layer onto one end of the tray and the osculatory motion of the tray causes the sand to advance along the tray immediately below the steam jets. The combination of the motion of the tray and the high temperature, high velocity steam softens and breaks up the sand agglomerations and clumps. As the sand progresses along the cleansing chamber, the hot steam renders the oil coatings on the sand particles less viscous and more flowable so that the oil not only drips from the particles, but is driven therefrom by the high velocity steam jets.

Furthermore, the osculatory motion of the tray jounces and bounces the sand particles so that they actually leave the screen and turn to exposed substantially their entire surfaces to the cleansing effect of the steam jets. Resultantly, by the time the sand particles reach the opposite end of the tray, most (e.g. at least 75%) of the oil has been removed from the sand particles so that the sand leaves the cleansing chamber in a clean state.

The warm and relatively flowable oil from the sand particles, entrained with steam condensate, is collected in the sump below the tray. The water and oil soon separate in the sump so that the former can be drained and reused in the boiler to help generate the steam for the cleansing chamber. The oil can be bled from the sump and sold.

The dwell time of the contaminated sand in the cleansing chamber can be altered through adjustment of the slope of the vibrating screen by inclining the cleansing chamber or the apparatus as a whole from end to end. The steeper the inclination, the faster the sand will proceed along the tray. When the oil in the sand is quite viscous or the outside temperature is relatively low, the sand should spend more time in the cleansing chamber so that the tray should be almost horizontal. Conversely, if the outside temperature is quite hot or the oil product in the sand is a very light machine oil, the tray can be inclined at a steeper angle so that the sand is carried along the tray at a faster rate and thus spends less time in the cleansing chamber.

In a typical situation, the prototype unit is able to cleanse 600 cubic yards of oil contaminated sand per day at an ambient temperature of 60 degrees F. On the other hand, in the summer when the weather is quite hot, say 90 degrees F., the apparatus will cleanse as much as 900 cubic yards per day. In winter at a temperature of 30 degrees F., the output of the apparatus may be only 300 cubic yards per day, the sand being deemed clean if 75% of the oil is removed.

The de-oiling machine is comparatively simple mechanically and is relatively immune to damage from larger solid objects such as shells, stones and other debris normally found on the beach. These objects simply travel along the osculating tray with the sand and are discharged back to whence they came. Therefore, downtime and maintenance cost are kept to a minimum. Furthermore, a single man suffices to monitor the machine in use. Therefore its operating costs are also low.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENT

Figure 1:
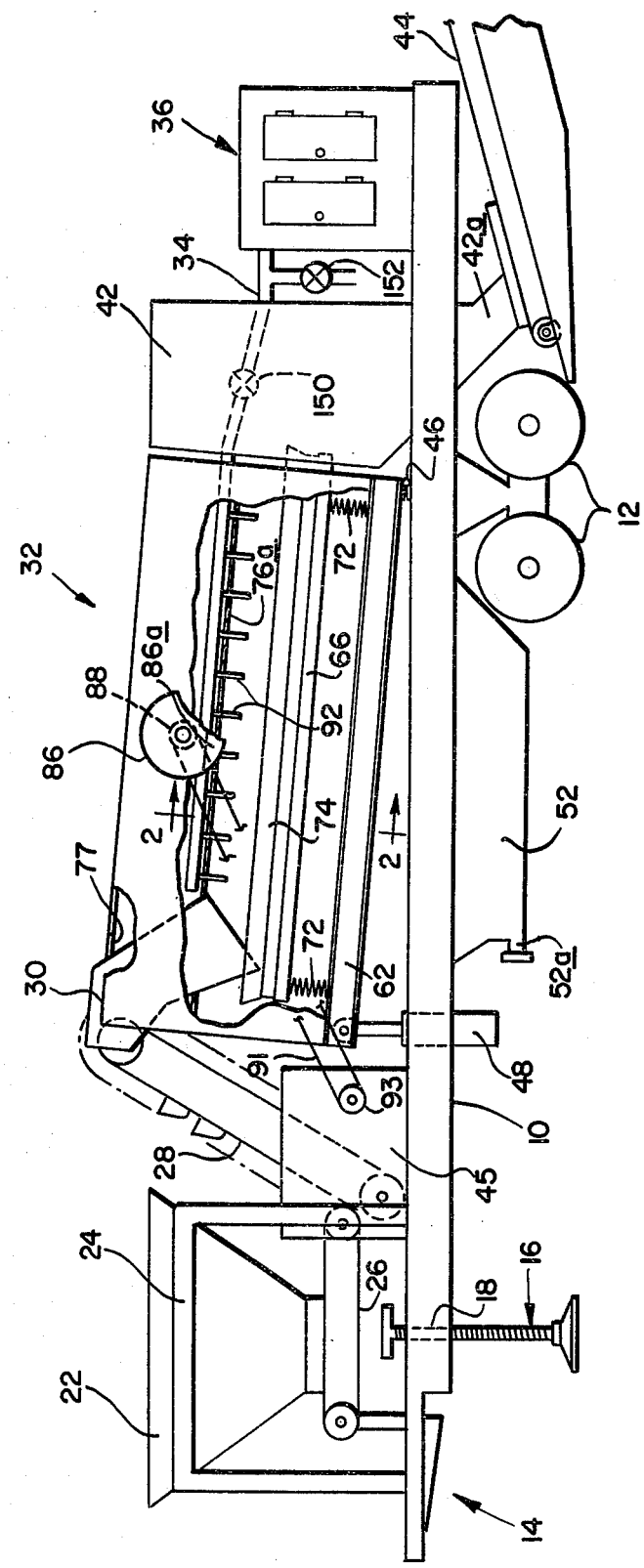
FIG. 1 is a diagrammatic view of mobile sand de-oiling apparatus incorporating the features of this invention.
Figure 2:
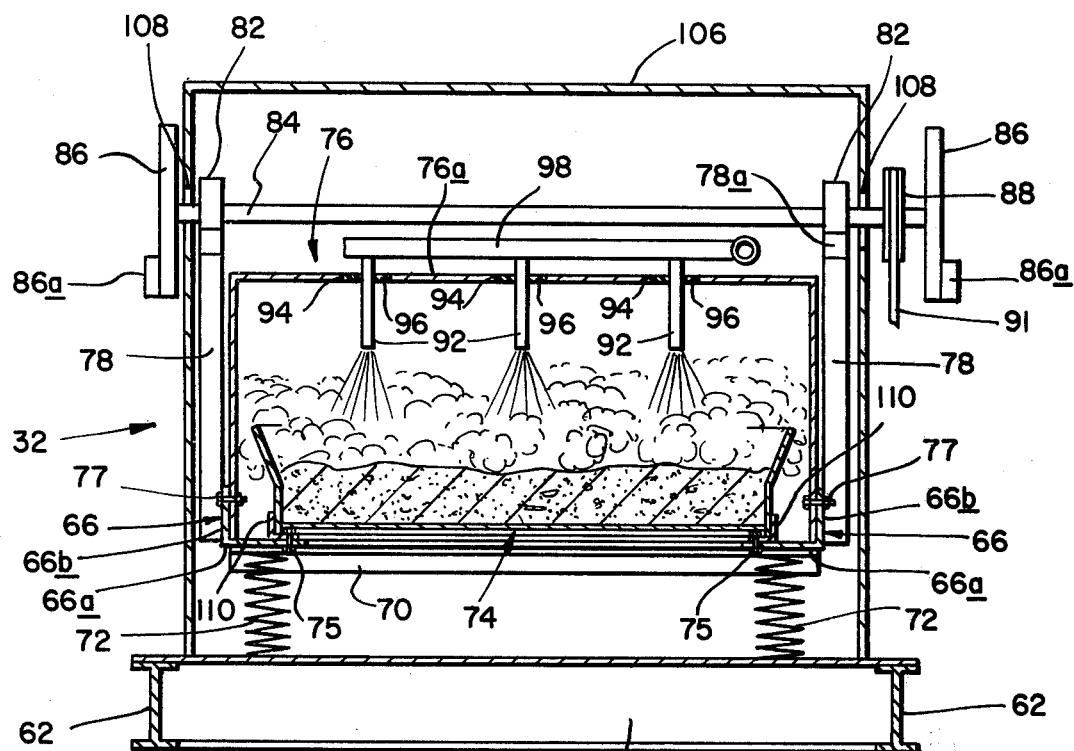
FIG. 2 is an enlarged sectional view along line 2—2 of FIG. 1.

Turning now to FIGS. 1 and 2 of the drawings, the apparatus comprises a chassis 10 outfitted with wheels 12. In the illustrated embodiment, the apparatus is intended to be towed. Accordingly, there is one set of wheels 12 disposed below the rear or right hand end of the apparatus. Also, a suitable fitting 14 is provided at its front or left end for connecting the apparatus to a conventional trailer hitch on a truck. One or more jack screws 16 are threaded into openings 18 in the front end of the chassis to maintain the chassis 10 horizontal when it stands alone.

A relatively large loading hopper 22 is supported by a frame 24 at an elevated location above the front end of the chassis. The contaminated sand from the beach is deposited in the hopper by means of a conveyor, front end loader or by hand. Positioned directly below the hopper is an endless belt conveyor 26 which transports the sand from the hopper to the lower end of a bucket elevator 28. The upper end of elevator 28 is located inside the entrance port 30 of a steam cleansing chamber shown generally at 32. Steam for the cleansing chamber is supplied by way of a pipe 34 for a gas-fired steam boiler 36 mounted near the rear end of chassis 10.

The contaminated sand transported by elevator 28 to port 30 enters chamber 32 and is subjected to the steam supplied to that chamber and is simultaneously, violently jounced and bounced. The sand, substantially free of oil, is transported to the opposite end of chamber 32 and leaves the chamber by way of a discharge chute 42 mounted on chassis 10 aft of chamber 32. The clean sand is thereupon deposited onto one end of a conveyor 44 located directly below the chute mouth 42a and is transported by conveyor 44 back to a suitable ground storage site (not shown).

Preferably, the conveyors 26 and 44 and elevator 28 are all driven by a common gasoline or electric motor unit 45 mounted on chassis 42 aft of hopper 22 through conventional pulley-type drives. Preferably also, these transports are separately speed controllable so that the rates at which sand is conducted to and from chamber 32 can be adjusted depending upon the ambient temperature and the type of contaminant in the sand.

Further, means are provided for adjusting the slope of chamber 32 from end to end in order to control the dwell time of the contaminated sand in the chamber. In the illustrated apparatus, a hinge 46 is connected between the exit end of chamber 32 and chassis 10 and one or more hydraulic pistons 48 are provided at the entrance end of the chamber whose cylinders are pivotally connected to chassis 10 and whose rod ends are pivoted to the underside of the chamber. Alternatively, the chamber 32 can be mounted horizontally on chassis 10 and its slope altered by adjusting the jack screw 16 thereby tilting the entire apparatus to the desired angle.

The oil contaminant removed from the steam as well as steam condensate drops into a large (e.g. 45,000 gal.) sump 52 suspended from the underside of chassis 10 directly below chamber 32. After the oil and water have separated in the sump, the water can be drained off by way of a spigot 52a and used to replenish the water supply for the steam boiler 36. The oil, on the other hand, can be sold to a refinery to help defray the operating expenses of the apparatus.

Still referring to FIGS. 1 and 2, the chamber 32 comprises a rectangular frame composed of side beams 62 and end beams 64. The frame is hingedly connected to chassis 10 at 46 as shown in FIG. 1. A second, somewhat smaller rectangular frame composed of side beams 66 and end beams 70 is resiliently supported above beams 62 and 64 by four relatively stiff vertical coil springs 72. Spanning the two side beams 66 is a tray shown generally at 74. Tray 74 extends the entire length of the side beams 66 and is removably secured thereto by bolts 75 (FIG. 2) extending through the tray and through the horizontal legs 66a of those beams.

A generally rectangular hood 76 is also supported by the side beams 66, being connected to their vertical legs 66b by bolts 77. The hood 76 extends the entire length of the side beams 66 and its top wall 76a is spaced appreciably above the tray 74. The front or left hand end of hood 76 is closed, and its top wall 76a has an opening 77 therein which receives the inner end of chute 30, tht end being welded to the wall of that opening. The rear or right hand end of the hood 76 is open.

A pair of standards 78 are connected at their lower ends to side beam legs 66b outboard of member 66. The top of each standard terminates in cross piece or T 78a which supports an upstanding ear 82. A shaft 84 extends across chamber 32 just above the hood top wall 76a its end portions being journaled in ears 82. The ends of shaft 84 project out beyond ears 82 sufficiently to receive a pair of relatively massive disks 86 having off-centered weights 86a mounted at their rims so that the disks function as eccentrics. The shaft 84 and eccentrics 86 are rotated by means of a pulley 88 fixed to the shaft just inboard of the right hand eccentric 86 (FIG. 2). Pulley 88 is connected by a belt 91 to a sheave 93 in motor unit 45 so as to rotate the shaft 84 at a selected rate. The rapid rotation of the eccentrics sets the chamber 32 including the tray 74 into violet oscillatory motion in a vertical plane on springs 72.

The chamber 32 also includes a rectangular array of steam nozzles 92, each of which projects down through an opening 94 in the hood top wall 76a. Feedthroughs or collars 96 made of polytetrafluoroethylene are provided for the nozzles which function as gaskets while allowing a certain amount of relative movement between the nozzles and the hood 76. In the illustrated embodiment of the apparatus, there are three columns of ten nozzles uniformly distributed above tray 74. The upper ends of the three nozzles 92 in each row are connected by a cross pipe 98 to a manifold 102 that extends the entire length of the column of ten nozzles. The manifold 102 receives high pressure (e.g. 150 lbs.), high temperature (e.g. 350 degrees F.) steam from pipe 34 leading to the steam generator 36 (FIG. 1). The nozzles 92 are positioned so that the steam issuing therefrom jets at a relatively high velocity down against the upper surface of the tray 74 over substantially the entire area of the tray. The hood 76 helps to confine the heat produced by the steam jets to the vicinity of the tray surface for maximum efficiency.

A generally rectangular cover 106 encloses the chamber 32 except for the eccentrics 86. The cover is connected to the stationary beams 62 and 64 and is sized to accommodate the osculatory movement of the chamber described above. Also appropriately sized openings 108 are provided in the side walls of the cover to accommodate the moving ends of shaft 84.

Figure 3:
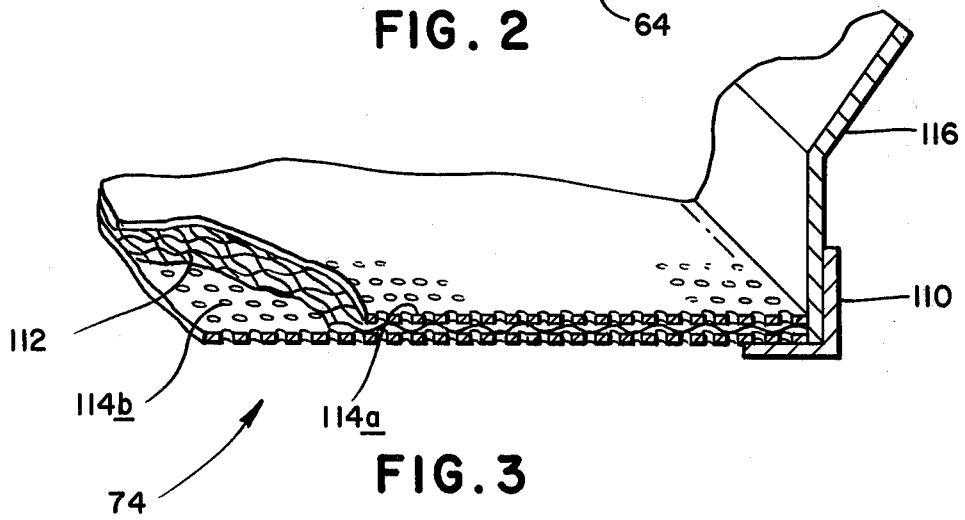
FIG. 3 is a fragmentary perspective view on a still larger scale showing a part of the FIG. 1 apparatus in greater detail.

Referring now to FIGS. 2 and 3, the tray 74 comprises a pair of side channels 110 between which stretches a lamination consisting of a single screen layer 112, on the order of 280 mesh, sandwiched between a pair of perforated metal plates 114a and 114b. Also secured to each channel at each side of the lamination is an upstanding baffle or deflector 116 which projects four or five inches above the uppermost plate 114a. These side deflectors corral the sand particles to an area of the tray inboard of channels 110 so that the contaminated sand on the tray is assuredly exposed to the steam jets.

The described tray 74 has been found to be particularly effective in being able to support the relatively heavy contaminated sand, while at the same time permitting adequate drainage of oil and water from the sand to the underlying sump 52.

In normal use, the present apparatus is towed or driven right onto the beach to the actual site of the oil contamination. Then the steam boiler 36 is fired up. At this time a valve 150 in the pipe 134 leading to chamber 32 can be shut to permit the buildup of steam pressure in the boiler 36. When the appropriate steam pressure is available, the engine unit 45 can be turned on so that the transports 26, 28 and 44 move at their own separately controlled rates. At the same time, the eccentrics 86 commence rotating so that the entire chamber 32 osculates in a vertical plane. Then the chamber 32 is tilted by extending the pistons 48 to a degree depending upon the estimated viscosity of the oil contaminant and the prevailing ambient temperature. Finally, the valve 150 is opened so that steam is applied to chamber 32 and jets from nozzles 92 onto the tray 74.

The contaminated sand can now be loaded into hopper 22. The sand is carried to chamber 32 by conveyors 26 and 28 and is deposited on the front or left hand end of the screen assembly 74. Immediately, the contaminated sand is subjected to the steam jets adjacent the mouth of chute 130 which heats the oil making it less viscous and more flowable.

Simultaneously, the contaminated sand is violently shaken by the osculating tray so that any clumps or agglomerations tend to break up. Also individual oil-covered sand particles are jounced so that they spin and turn, exposing their entire surfaces to the steam jets as they are transported along the chamber by the osculating tray. The force of the steam jets drives the heated oil from the sand particles and the oil entrained in steam condensate drops through the perforated plates 114a and 114b and screen 112 into sump 52 as these particles are transported along the osculating chamber 32.

After initial startup, the sand discharged from the exit end of the chamber is inspected and if the oil content thereof is excessive, the inclination of chamber 32 may be reduced so that the contaminated sand is transported at a slower rate along the chamber. In this fashion, the dwell time of the sand in the chamber is adjusted until the sand particles discharging through chute 42 have been adequately cleaned. In this connection the sand is deemed sufficiently clean if at least 75% of the oil contaminant has been removed from the sand particles.

Likewise during this initial startup sequence, the speeds of the conveyors 26 and 28 are adjusted so as to deposit a layer of sand on the screen assembly that is on the order of four or five inches high. By the same token the speed of conveyor 44 is adjusted so that there is no buildup of clean sand at the mouth of the disposal chute 42. After this initial startup inspection and adjustment, the apparatus can operate continuously for a prolonged period as long as contaminated sand is loaded into the hopper 22 with only a single operator being required to supervise the apparatus.

When all of the contaminated sand has been processed as described above, the steam boiler 36 and engine unit 45 can be turned off. Any remaining pressure in the boiler can be vented to the atmosphere by opening a vent valve 152 in pipe 34 located just upstream of valve 150. Finally the chamber 32 can be lowered to its horizontal position by actuating the pistons 48 and the apparatus moved closer to a new site of oil contamination.

It will be seen from the foregoing then that the present apparatus is composed of a relatively few rugged mechanical parts which should require a minimum amount of maintenance. Accordingly, the apparatus should be able to operate reliably for a long period with minimum down time. Also the simple, uncluttered construction of the apparatus and particularly its chamber 32 enables the apparatus to tolerate stones, shells, and other solid debris normally found in the sand on a typical beach. These larger solid objects are simply processed through the apparatus along with the sand.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

I claim:

1. Apparatus for cleaning oil from sand comprising
    A. an elongated perforate tray having an entrance end and an exit end,
    B. means for adjustably inclining the tray so that its entrance end is as high or higher than its exit end,
    C. means for depositing oil-contaminated sand on the entrance end of said tray,
    D. means for vibrating the tray so that the sand deposited thereon is transported along said tray toward its exit end,
    E. means disposed above the tray for directing a multiplicity of high velocity steam jets against the upper surface of the tray over substantially its entire area so that any oil contaminating the sand on the tray is heated, made flowable and is driven by the steam jets from the sand particles through the tray as the sand particles proceed along the tray, and F. means located below the tray for collecting the oil contaminant and steam condensate the drips through the tray.

2. The apparatus defined in claim 1 wherein the means for depositing sand on the tray includes
   A. a hopper, and
   B. conveyor means for transporting sand from the hopper to the entrance end of the tray.

3. The apparatus defined in claim 2 and further including second conveyor means for transporting clean sand issuing from the exit end of the tray to a disposal site.

4. The apparatus defined in claim 1 wherein the steam jet directing means includes
   A. an array of steam nozzles targeted at the tray surface,
   B. a manifold interconnecting the nozzles, and
   C. a steam boiler for supplying steam to said manifold at an elevated temperature and pressure.

5. The apparatus defined in claim 1 wherein said tray comprises,
   A. a first perforate metal plate,
   B. a second perforate metal plate,
   C. a metal screen mesh sandwiched between said plates, and
   D. means for retaining said plates and screen flush against one another.

6. The apparatus defined in claim 1 wherein the vibrating means comprises
   A. means for resiliently supporting the tray,
   B. eccentric means,
   C. means for mounting the eccentric means to move with the tray, and
   D. means for rotating the eccentric means about a horizontal axis so that the tray osculates parallel to a vertical plane.

7. The apparatus defined in claim 6,
   A. further including a hood disposed over the tray except for entrance and exit ends, and
   B. wherein the steam producing means project through a wall of the hood so that the heat developed by the steam issuing therefrom is confined to the region of the tray.

8. The apparatus defined in claim 1 and further including a wheeled chassis for movably supporting the depositing means, vibrating means, collecting means and tray directing means.

* * * * *

UNITED STATES PATENT AND TRADEMARK OFFICE
CERTIFICATE OF CORRECTION

PATENT NO. : 4,132,010

DATED : January 2, 1979

INVENTOR(S) : Robert E. Delano

It is certified that error appears in the above—identified patent and that said Letters Patent are hereby corrected as shown below:

Title Page, Heading, Inventor's name should be changed from "Deland" to --Delano--.

Title Page, Item 75, Inventor's name should be changed from "Deland" to --Delano--.

Signed and Sealed this

Twenty-ninth Day of May 1979

[SEAL]

Attest:

RUTH C. MASON
*Attesting Officer*

DONALD W. BANNER
*Commissioner of Patents and Trademarks*